US008731163B1

(12) United States Patent
Bates et al.

(10) Patent No.: US 8,731,163 B1
(45) Date of Patent: May 20, 2014

(54) IDENTIFYING CALLERS

(75) Inventors: Peter Charles Bates, Morristown, NJ (US); Monica Ingudam, Rockville, MD (US); Carolyn Cimmet, Arlington, VA (US)

(73) Assignee: AOL Inc., Dulles, VA (US)

( * ) Notice: Subject to any disclaimer, the term of this patent is extended or adjusted under 35 U.S.C. 154(b) by 1736 days.

(21) Appl. No.: 11/746,243

(22) Filed: May 9, 2007

Related U.S. Application Data

(60) Provisional application No. 60/885,548, filed on Jan. 18, 2007.

(51) Int. Cl.
*H04M 15/06* (2006.01)
*H04M 3/42* (2006.01)

(52) U.S. Cl.
USPC ..................... 379/142.06; 455/415

(58) Field of Classification Search
USPC .................. 379/33, 45, 46, 142.07, 221.014; 370/351–356
See application file for complete search history.

(56) References Cited

U.S. PATENT DOCUMENTS

| | | | | |
|---|---|---|---|---|
| 7,027,575 B1 * | 4/2006 | Burgess | ................... | 379/201.01 |
| 7,340,262 B1 * | 3/2008 | Gillespie et al. | ............ | 455/456.3 |
| 7,546,112 B2 * | 6/2009 | Cheng | ......................... | 455/404.2 |
| 8,036,342 B2 * | 10/2011 | Breen et al. | ...................... | 379/45 |
| 2002/0106069 A1 * | 8/2002 | Shaffer et al. | ............ | 379/207.12 |
| 2002/0146111 A1 * | 10/2002 | Hayashi | ................... | 379/355.08 |
| 2003/0147519 A1 * | 8/2003 | Jain et al. | ................. | 379/211.02 |
| 2005/0079874 A1 * | 4/2005 | Benco et al. | ............... | 455/456.1 |
| 2005/0180403 A1 * | 8/2005 | Haddad et al. | ................ | 370/352 |
| 2006/0205383 A1 * | 9/2006 | Rollender | ................. | 455/404.1 |
| 2007/0190968 A1 * | 8/2007 | Dickinson et al. | ......... | 455/404.1 |
| 2008/0089501 A1 * | 4/2008 | Benco et al. | ............ | 379/142.01 |
| 2008/0267172 A1 * | 10/2008 | Hines et al. | ................... | 370/352 |
| 2010/0239074 A1 * | 9/2010 | Breen et al. | ..................... | 379/45 |

OTHER PUBLICATIONS

Interim VoIP Architecture for Enhanced 9-1-1 Services (i2), NENA Template for Creating or Updating E9-1-1 Standards Documents, Issue 1 DRAFT, Aug. 5, 2005.
News.com, FAQ: FCC sets rules for VoIP 911—reprinted on Sep. 15, 2006 http://news.com.com/2102-7352_3-5746838.html?tag=st.util.print.
VoIP/911 Services—reprinted Sep. 15, 2006; http://www.voip911.gov/.
911 Services, Enhanced 911—Wireless Services—reprinted Sep. 15, 2006, http://www.fcc.gov/911/enhanced/.

(Continued)

*Primary Examiner* — Fan Tsang
*Assistant Examiner* — Solomon Bezuayehu
(74) *Attorney, Agent, or Firm* — Finnegan, Henderson, Farabow, Garrett & Dunner, LLP

(57) ABSTRACT

Identifying a caller includes establishing, by a service provider, a connection over a computer network with a user device and accessing information enabling determination of a location of the user. A request to place a call to a call recipient is received from the user and a pool of temporary telephone numbers is accessed. Based on the location of the user, a temporary telephone number from the pool of temporary telephone numbers is selected. The temporary telephone number is associated with the call, the call is initiated to the call recipient, and information sufficient to identify the temporary telephone number is provided in call information sent to the call recipient.

25 Claims, 7 Drawing Sheets

(56) References Cited

OTHER PUBLICATIONS

FCC, Consumer & Government Affairs Bureau, Wireless 911 Services—reprinted Sep. 15, 2006, http://www.fcc.gov/cgb/consumerfacts/wireless911srvc.html.

Enhanced 911—reprinted Sep. 15, 2006, http://en.wikipedia.org/wiki/E911.

TechNews World, Technology News: VoIP: VoIP Providers Tackle E911 Issues—reprinted Sep. 15, 2006, http://www.technewsworld.com/story/50967.html.

RedSky Technologies: How E911 Works? E911 Requirements and Call Process—reprinted Sep. 15, 2006, http://www.redskytech.com/e911_Center/how_works/.

Intrado, VoIP 9-1-1 Frequently Asked Questions for Public Safety Answering Point Personnel—reprinted Sep. 15, 2006, http://www.intrado.com.

Alcatel, Patrick Daniel, NENA i2 market solutions & consequent recommendations on IP PBX system design, Oct. 6, 2005.

Alcatel, Patrick Daniel, VoIP E911, Backup slides on TCS seen as THE active player, Oct. 6, 2005.

Federal Communications Commission FCC 05-116, First Report and Order and Notice of Proposed Rulemaking—E911 Requirements for IP-Enabled Service Providers, released Jun. 3, 2005.

* cited by examiner

IDENTIFYING CALLERS

CROSS REFERENCE TO RELATED APPLICATIONS

The present application claims priority to U.S. Provisional Application No. 60/855,548, filed Jan. 18, 2007, the contents of which are incorporated herein by reference in their entirety.

TECHNICAL FIELD

This disclosure relates to identifying and assigning correct location information to callers in a communications system.

BACKGROUND

The Emergency Services system (E9-1-1) in North America is currently, and for the foreseeable future a service that is closely connected to the existing Public Switched Telephone Network (PSTN). New communications services (e.g., a cellular system or an internet protocol (IP) system) are being employed that differ from the PSTN and require the ability to communicate with Emergency Services. Techniques have been developed to enable new communication services to interface with the current Emergency Services system.

SUMMARY

In one aspect, a connection is established by a service provider over a computer network with a user device used by a user and a location of the user is determined. A request to place a call to a call recipient is received from the user and a pool of temporary telephone numbers is accessed. Based on the location of the user, a temporary telephone number is selected from among the pool of temporary telephone numbers. The temporary telephone number is associated with the user, the call is initiated to the call recipient, and information sufficient to identify the selected temporary telephone number is provided in call information sent to the call recipient.

Implementations may include one or more of the following features. For example, a second call may be received from the call recipient placed to the temporary telephone number, and information associated with the temporary telephone number may be accessed. The information may enable determination of a temporary user associated with the temporary telephone number. The user may be identified based on the information that may enable determination of a temporary user associated with the temporary telephone number, and the second call may be connected to the identified user.

In some implementations, the information associated with the temporary telephone number may enable determination of a method of connecting the second call to the identified user. In such implementations, a method of connecting the second call to the identified user may be determined based on the information that may enable determination of the method of connecting the second call to the identified user, and the second call may be connected to the identified user using the determined method.

Information sufficient to identify the selected temporary telephone number may be provided in call information sent to the call recipient to enable the call recipient to determine the location of the user. The location of the user may be a current location of the user that is remote from a location where the user typically connects to the service provider.

In some implementations, the temporary telephone number may be associated with the user during the connection to the service provider. In such implementations, association of the temporary telephone number with the user may be maintained until the user disconnects from the service provider. In further implementations, the user may be a first user, a request to place a second call from a second user to a second call recipient may be received, and a location of the second user may be determined. The second user may be different than the first user. Based on the location of the second user, the temporary telephone number may be selected from among the pool of temporary telephone numbers, the temporary telephone number may be associated with the second user, the second call may be initiated to the second call recipient, and the temporary telephone number may be provided in call information sent to the second call recipient. The location of the second user may be associated with the same geographic region as the location of the first user.

In some implementations, a third call may be received from the second call recipient placed to the temporary telephone number, and information associated with the temporary telephone number may be accessed. The information may enable determination of a temporary user associated with the temporary telephone number. In such implementations, the second user may be identified based on the information that may enable determination of a temporary user associated with the temporary telephone number, and the third call may be connected to the second user.

In some implementations, the information associated with the temporary telephone number may enable determination of a method of connecting the third call to the second user, a method of connecting the third call to the identified user may be determined based on the information that may enable determination of the method of connecting the third call to the second user, and the third call may be connected to the second user using the determined method.

The temporary telephone number may be a telephone number in a public switched telephone network, and the pool of temporary telephone numbers may include at least one telephone number for each geographic region serviced by the service provider.

In some implementations, user input may be received from the user indicating the location of the user. A location key may be associated with the user, and the location key may be sent to the user such that subsequent communications with the user include the location key. A communication may be received from the user, that includes a location key identifying the location of the user.

In some implementations, the call may be a call for emergency services and the call recipient may be a public safety access point. In such implementations, the information sufficient to identify the selected temporary telephone number provided in call information sent to the call recipient may enable the public safety access point to determine the location of the user and may enable the user to receive a return call front the public safety access point.

Selecting and associating may be conditioned on the call being a call for emergency services, and the service provider may be a voice over internet protocol service provider.

Implementations of the described techniques may include hardware, a method or process, or computer software on a computer-accessible medium. The details of one or more implementations are set forth in the accompanying drawings and the description below. Other features will be apparent from the description and drawings.

DESCRIPTION OF DRAWINGS

Like reference symbols in the various drawings indicate like elements.

DETAILED DESCRIPTION

Figure 1:
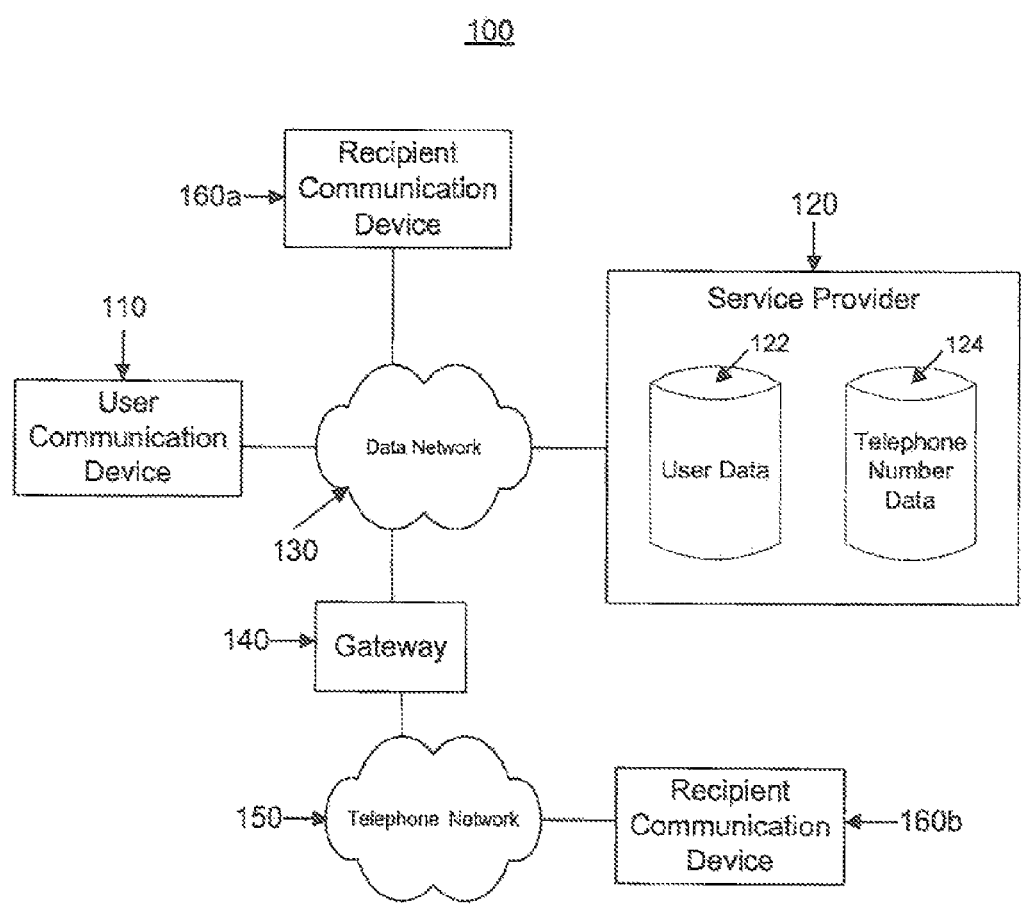
FIG. 1 is a block diagram of a communications system configured to identify users when no or only ambiguous identity information is available.

When a caller establishes a connection with or places a call to a service provider, the service provider may receive information indicating the current service location from the caller or otherwise determines the current service location of the caller. The current service location may be associated with a telephone number following the North American Numbering Plan or the current service location may be declared by the caller but not associated with the normal telephone number identification of the caller. Some services require a current service location tied directly to a geographically-correct telephone number. Based on the current service location, the communications service provider assigns a temporary, geographically-correct telephone number to the caller from a pool of available telephone numbers. The caller may receive calls placed to the temporary telephone number through the caller's connection with the service provider and the temporary telephone number may be included in calls placed by the caller to enable a recipient of a call to identify a location and/or an identity of the caller.

In one example, a user places a call for emergency services (e.g., a 9-1-1 call) using a device that does not include or otherwise communicate information sufficient to enable identification of the user's location. A communications service provider handling the call for emergency services determines a location of the user and assigns a temporary, geographically-correct telephone number (e.g., a telephone number including a 202 area code for a call that was determined to have been made by a user located in the Washington, D.C. area, where the 202 area code indicates that the user placed the call from the Washington, D.C. area) to the user who placed the call for emergency services. The communications service provider routes the call with call information including the temporary, geographically-correct telephone number. The traditional emergency services call handling system routes the call to the appropriate public safety answering point (PSAP) based on the location associated with the temporary telephone number and establishes the emergency services call between the user and the PSAP. The PSAP may be able to determine the location of the user based on the location associated with the temporary telephone number. In the event that the emergency services call becomes disconnected, the PSAP may place a return call to the temporary telephone number. The communications service provider may receive the return telephone call placed to the temporary telephone number and may be able to connect the return telephone call to the user's device that does not include information sufficient to enable identification of the user and/or the user's location. For instance, in the example above, the PSAP places a call to the temporary telephone number over the PSTN, which is routed to the communications service provider associated with the disconnected user, and the communications service provider uses the temporary telephone number to identify the user (or user device) and routes the return call to that user.

FIG. 1 illustrates an example of a communications system 100 configured to identify users when no or only ambiguous identity information is available. The communications system 100 includes a user communication device 110, a communications service provider 120, a gateway 140, and one or more recipient communication devices 160a, 160b. The communications service provider 120 and the gateway 140 facilitate communications between the user communication device 110 and the one or more recipient communication devices 160a, 160b over data network 130 and telephone network 150.

The user communication device 110 is configured to place a call to, and/or receive a call from, a recipient communication device 160a, 160b after establishing a connection with communications service provider 120. The user communication device 110 may be a landline or wireline phone, a wireless phone, a cellular phone, a mobile personal digital assistant (PDA) with embedded cellular phone technology, or a soft phone, which is a telephone integrated into a computer system. Alternatively or additionally, user communication device may be integrated into a client computer system.

The user communication device 110 does not include information sufficient to enable identification of the user communication device 110 and/or its location when communicating using the communications system 100. For example, the user communication device 110 may be a voice over internet protocol (VoIP) telephone that has no registered telephone number in the PSTN. In another implementation, the user communication device 110 may be a device that establishes a connection with communications service provider 120 and communicates using a service level identifier (e.g., a screen name). In this implementation, multiple users of the communications system may communicate using user communication device 110, for example, by using user communication device 110 to supply communications service provider 120 with a screen name and password. In addition, the user communication device 110 may be mobile such that the user communication device 110 may establish a connection with communications service provider 120 at multiple different points in data network 130 located in multiple different geographic areas.

The communications service provider 120 is configured to establish a connection with user communication device 110 to facilitate communications between the user communication device 110 and a recipient communication device 160a, 160b. In one implementation, the communications service provider 120 is a computer system configured to provide online services to users, including data and/or voice services. The online services may include communications services, such as, for example, one or more of e-mail services, instant messaging services, chat services, VoIP services, and traditional telephony services, and content provisioning services, such as, for example, Internet access (e.g., access to the World Wide Web) and/or access to online content (e.g., access to otherwise restricted or proprietary content).

The communications service provider 120 includes a user data store 122 and a telephone number data store 124. The user data store 122 is one or more locally or remotely accessible storage devices configured to store user records that include information related to registered users of the communications service provider 120. The user data store 122 may include information necessary to perform authentication of users and/or user communication devices. For example, the user data stare 122 may include a service level identifier (e.g., a screen name) and password for users of the communications service provider 120. Alternatively or additionally, the user data store 122 may include information to automatically identify users when the user accesses the communications service provider 120. For example, the user data store 122 may include device authentication information, such as an IP address or device identifier of a particular user device, and/or may include information necessary to verify a cookie stored on, for example, the user communication device 110. The user data store 122 may also include user contact information such as a physical address (i.e., street address, state, and zip code), an instant messaging screen name, an e-mail address, and/or telephone numbers (e.g., a cell phone number). In one implementation, the user data store 122 is configured to store a list of physical addresses where a user establishes a connection to communications service provider 120. The list of physical addresses may include, for example, physical addresses previously submitted to the communications service provider 120 and/or physical addresses detected by the communications service provider 120 where the user has previously connected. The user data store 122 may also store a current physical address where the user is using the user communication device 110 to connect to the communications service provider 120. In one implementation, the communications service provider 120 provides the user communication device 110 with a location key to include with subsequent communications after the current physical address of the user accessing the communications service provider 120 with the user communication device 110 has been determined. The current physical address may be explicitly supplied by the user, may be selected by the user from the list of physical addresses associated with the user, may be detected by the service provider, and/or may be automatically sent to the service provider during operation of the user communication device 110. The current physical address may be determined when the user establishes a connection to the communications service provider 120 using the user communication device 110 and may be updated to reflect changes in the physical address of the user during the connection to the communications service provider 120. The current physical address may be used to identify the user and assign a temporary telephone number as described below.

The telephone number data store 124 is one or more locally or remotely accessible storage devices configured to store telephone number records associated with the communications service provider 120. The telephone number data store 124 may be included on the same storage device as the user data store 122 or may be included on a different storage device. In one implementation, the telephone number data store 124 includes a pool of geographically-correct telephone numbers for those physical service addresses from which users may connect to the communications service provider 120. For example, the telephone number data store 124 may include at least one telephone number geographically-correct for each of the geographic area the communications service provider 120 services. The telephone numbers included in the telephone number data store 124 may be temporarily assigned to users connected to the communications service provider 120 for purposes of identification and as return call numbers (e.g., when the user communication device 110 is not associated with a telephone number) as described below.

The data network 130 is configured to enable communications between devices connected to the data network 130. For example, the data network 130 may be configured to enable communications between the user communication device 110, the communications service provider 120, the gateway 140, and the recipient communication device 160a. The data network 130 may include, for example, one or more of the Internet, Wide Area Networks (WANs), Local Area Networks (LANs), analog or digital wired and wireless telephone networks (e.g., a PSTN, Integrated Services Digital Network (ISDN), and Digital Subscriber Line (xDSL)), radio, television, cable, satellite, and/or any other delivery or tunneling mechanism for carrying data or VoIP services. Data network 130 may include multiple networks or subnetworks, each of which may include, for example, a wired or wireless data pathway.

The gateway 140 is configured to enable communications between data network 130 and telephone network 150. For example, the gateway 140 may convert communications from data network 130 to communications suitable for delivery over telephone network 150 and may convert communications from telephone network 150 to communications suitable for delivery over data network 130. In one implementation, the gateway 140 is a PSTN gateway configured to convert communications from data network 130 (e.g., IP packets) to communications suitable for delivery by a PSTN. By enabling communications between data network 130 and telephone network 150, the gateway 140 enables communications between a device connected only to data network 130 and a device connected only to the telephone network 150.

The telephone network is configured to enable communications between devices connected to the telephone network 150. For example, the telephone network may he configured to enable communications between the gateway 140 and the recipient communication device 160b. The telephone network 130 may include a circuit-switched voice network, a packet-switched data network, or any other network able to carry voice communications. For example, circuit-switched voice networks may include the PSTN, and packet-switched data networks may include networks based on the Internet protocol (IP), X.25, or Frame Relay, or other comparable technologies and may support voice using, for example, VoIP, or other comparable protocols used for voice data communications.

The recipient communication devices 160a, 160b are configured to exchange communications with the user communication device 110. For example, the recipient communication devices 160a, 160b may be configured to receive communications from and/or send communications to the user communication device 110. The recipient communication devices 160a, 160b may be configured to initiate communication sessions with the user communication device 110 and/or establish communication sessions with the user communication device 110 initiated by the user communication device 110. For example, the recipient communication devices 160a, 160b may be configured to place calls to the user communication device 110 and/or receive calls from the user communication device 110. In one implementation, the recipient communication device 160a may be connected to data network 130 and may exchange communications with the user communication device 110 over the data network 130. For example, the communications service provider 120 may be configured to establish a communication session between the user communication device 110 and the recipient communication device 160a and the recipient communication device 160a may then exchange communications with the user communication device 110 directly over data network 130 or may exchange communications with the user communication device 110 through the communications service provider 120. In another implementation, the recipient communication device 160*b* may be connected to the telephone network 150 and may exchange communications with the user communication device 110 utilizing the telephone network 150, the gateway 140, and the data network 130. For example, the communications service provider 120 may be configured to establish a communication session between the user communication device 110 and the recipient communication device 160*b* and the recipient communication device 160*b* may then exchange communications with the user communication device 110 directly via the telephone network 150, gateway 140, and data network 130 or may exchange communications with the user communication device 110 through the communications service provider 120.

In one implementation, the user communication device 110 does not include information sufficient to enable identification of the user and/or its location and the user communication device 110 may not include an incoming telephone number. For example, the user communication device 110 may be a computer system executing a voice messaging application. In this implementation, the communications service provider 120 may be configured to assign the user communication device 110 a temporary telephone number from the telephone number data store 124 that is geographically correct for the user communication device 110. The temporary telephone number may be included in communications with the recipient communications device 160*a* or 160*b* such that the recipient communication device 160*a* or 160*b* may be able to determine the geographic location of the user communication device 110 by analyzing the temporary telephone number. For example, the geographic location of the user communication device 110 may be determined by comparing the temporary telephone number to a mapping of telephone numbers to locations. In another implementation, the temporary telephone number may be assigned to the user communication device 110 when the user communication device 110 establishes a connection with the communications service provider 120 and enable the user communication device 110 to receive calls placed to the temporary telephone number. In this implementation, the communications service provider 120 is configured to receive a call placed to the temporary telephone number, determine that the user communication device 110 is currently associated with the temporary telephone number, and complete the call to the user communication device 110. For example, if a call between the user communication device 110 and the recipient communication device 160*a* or 160*b*, the recipient communication device 160*a* or 160*b* may call the user communication device 110 using the temporary telephone number. After the user communication device 110 disconnects from the communications service provider 120 or ends a communication session with a recipient communication device 160*a* or 160*b*, the communications service provider 120 is configured to return the temporary telephone to the pool of available telephone numbers.

In some implementations, the communications service provider 120 may automatically assign a temporary telephone number to the user communication device 110 when the communications service provider 120 receives a request to engage in a communication session from the user communication device 110. For example, the communications service provider 120 may be configured to determine that the type of communication session requested by the user communication device 110 would benefit from having a temporary telephone number. In this example, the communications service provider 120 automatically assigns a temporary telephone number to the user communication device 110 based on the current physical address for the user communication device 110 stored in user data store 122 or based on a location key included in the communication request from the user communication device 110. In another example, the communications service provider 120 may determine that the type of communication session requested by the user communication device 110 would not benefit from having a temporary telephone number and would not automatically assign a temporary telephone number.

Figure 2:
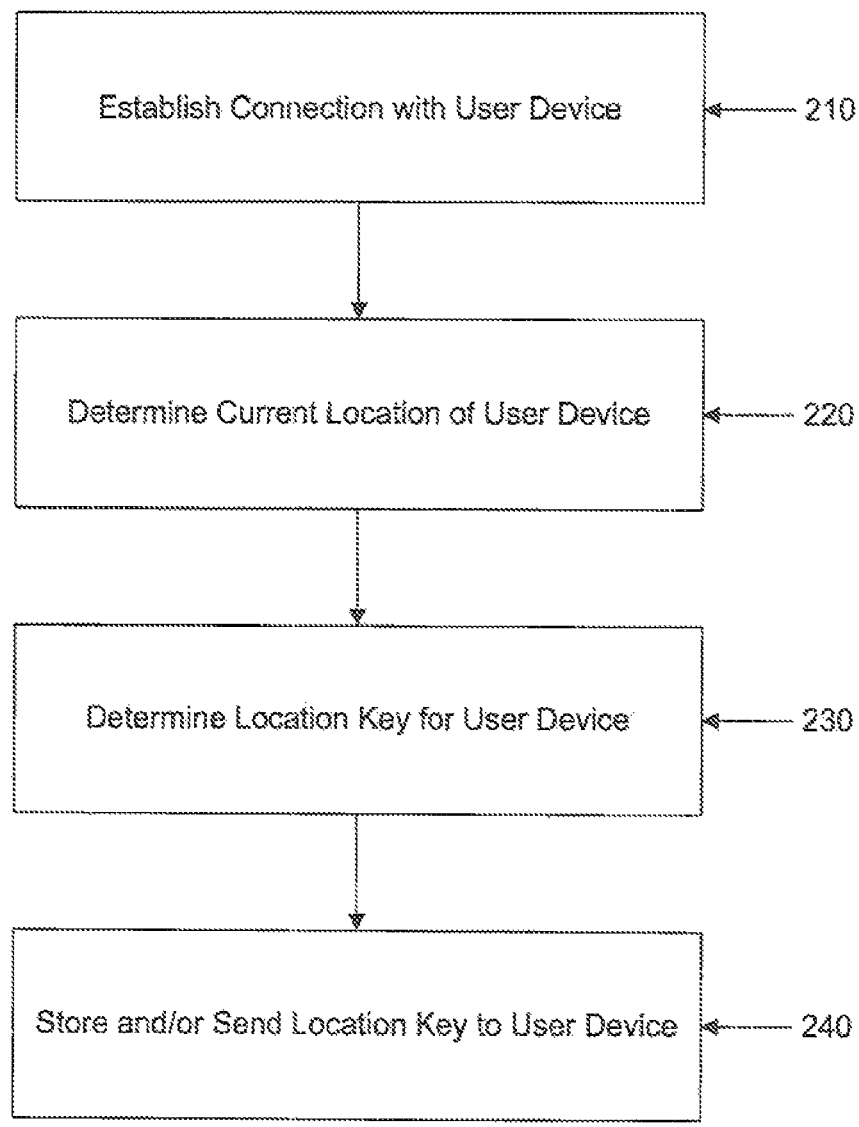
FIG. 2 is a flow chart of a process for determining a location key for a user device in a communications system.

FIG. 2 is a flow chart of a process 200 for determining a location key for a user device in a communications system. For convenience, particular components described with respect to FIG. 1 are referenced as performing the process 200. However, similar methodologies may be applied in other implementations where different components are used to define the structure of the system, or where the functionality is distributed differently among the components shown by FIG. 1.

The communications service provider 120 establishes a connection with user communication device 110 (210). For example, the communications service provider 120 may receive a request to establish a connection from the user communication device 110. In one implementation, the communications service provider 120 may also receive a service level identifier (e.g., a screen name) and password from the user communication device 110. In this implementation, the communications service provider 120 compares the service level identifier and password with information included in the user data store 122 to authenticate the user. If the communications service provider 120 determines that the service level identifier and password are authentic, the communications service provider 120 establishes an authenticated connection with the user. If the communications service provider 120 determines that the service level identifier and password are not authentic, the communications service provider 120 denies the connection request and sends an error message. In another implementation, the communications service provider 120 may automatically identify and authenticate users when a user accesses the communications service provider 120 based on information included in user data store 122. For example, the user data store 122 may include device authentication information, such as a device identifier of a particular user device, and/or may include information necessary to verify a cookie stored on, for example, the user communication device 110. Additionally or alternatively, the communications service provider 120 may establish a connection without requiring authentication and/or may maintain an established connection with a user communication device.

The communications service provider 120 determines a current location of the user communication device 110 (220). The communications service provider 120 may determine the current location of the user communication device 110 while establishing a connection with the user communication device 110 or after establishing a connection with the user communication device 110. For example, the communications service provider 120 may receive an indication of the current location of the user communication device 110. In one implementation, the user provides his or her current location by explicitly providing his or her address (e.g., entering location in a text box provided in a graphical user interface (GUI) of the communications service provider 120 or orally reciting location in a voice communication). In another implementation, the communications service provider 120 maintains a list of potential locations for the user and the user selects a location from a list provided by the communications service provider 120 (e.g., selecting a location from a drop-down menu included in a GUI of the communications service provider 120 or selecting a location using an IVR provided by the communications service provider 120). In another example, the communications service provider 120 may detect the current location of the user communication device 110 and/or may automatically receive the location of the user communication device during operation of the user communication device 110. For example, the communications service provider 120 may determine a current location of the user communication device 110 based on an IP address the user communication device is using to connect to the data network 130, may receive global positing system (GPS) data indicating an address of the user communication device 110, and/or may determine a current location using triangulation from a plurality of wireless communication points the user communication device 110 is using to access the data network 130. In another example, the location may be determined from radios connected to the user communication device 110. In this example, the location may be explicitly determined from radios connected to the user communication device 110, may be indirectly determined from radios connected to the user communication device 110, or derived from radios connected to the user communication device 110. The location determined may be a location of the user and/or a location of the user device.

The communications service provider 120 determines a location key for the user communication device 110 based on the current location of the user communication device 110 (230). The location key is an identifier used by the communications service provider 120 to identify a particular location. The communications service provider 120 may generate the location key by applying an algorithm to the current location of the user or by accessing a location key for the current location of the user from a table stored locally or remotely from the communications service provider 120 or may randomly generate a unique key to associate with the location. The location key may enable the communications service provider 120 or another entity to determine the location associated with the location key and may be directly used in routing and processing communications.

The communications service provider 120 stores and/or sends the location key to the user communication device 110 (240). For example, the service provider may store the location key for the current location of the user in the user data store 122 associated with the user's records. In this example, the communications service provider 120 may retrieve the location key for the user when needed (e.g., when the user places a call). Additionally or alternatively, the communications service provider 120 may send the location key to the user communication device 110. The user communication device 110 may store the location key and include the location key in subsequent communications sent by the user communication device 110. By including the location key in communications sent from the user communication device 110, the communications service provider 120 or another system or service may be able to request access to the location information associated with the location key to determine the location from which the communications originated.

Figure 3:
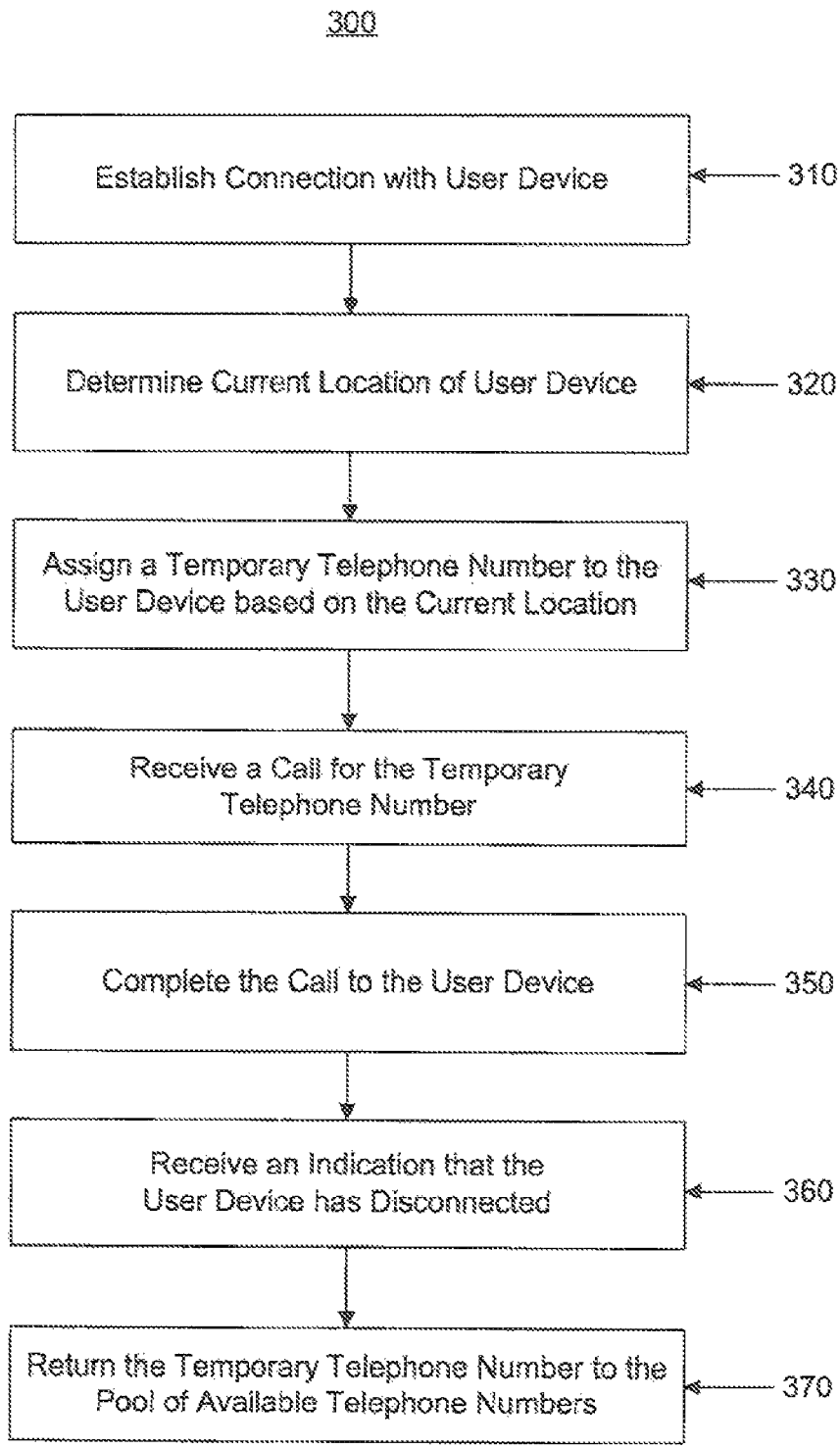
FIG. 3 is a flow chart of a process for assigning a temporary telephone number to a user device in a communications system.

FIG. 3 is a flow chart of a process 300 for assigning a temporary telephone number to a user device in a communications system. For convenience, particular components described with respect to FIG. 1 are referenced as performing the process 300. However, similar methodologies may be applied in other implementations where different components are used to define the structure of the system, or where the functionality is distributed differently among the components shown by FIG. 1.

The communications service provider 120 establishes a connection with the user communication device 110 (310) and determines a current location of the user communication device 110 (320). Establishing a connection to and determining a current location of the user communication device 110 have been described above with respect to FIG. 2.

The communications service provider 120 assigns a temporary telephone number to the user communication device 110 based on the current location of the user communication device 110 (330). For example, the user communication device 110 may not have a registered telephone number in the PSTN and may not be otherwise configured to receive calls placed to a telephone number. In one implementation, the communications service provider 120 maintains a pool of telephone numbers associated with the communications service provider 120. The pool of telephone numbers may, for example, include at least one telephone number that is geographically correct for each of the geographic areas serviced by the service provider. The communications service provider 120 may be configured to temporarily assign one of the telephone numbers included in the pool of telephone numbers to the user communication device 110. For example, the communications service provider 120 may associate the user with the telephone number in electronic storage such that calls received at the telephone number will be identified as calls placed to the user.

The communications service provider 120 receives a call for the temporary telephone number (340). For example, the communications service provider 120 receives a call from a recipient communication device 160*a* or 160*b* through one or more of data network 130, gateway 140, and telephone network 150.

The communications service provider 120 completes the call to the user communication device 110 (350). For example, the communications service provider 120 provides the communications sent to the temporary telephone number to the user communication device 110 through the connection over data network 130 previously established between the communications service provider 120 and the user communication device 110. In this implementation, the user communication device 110 can receive calls placed to the temporary telephone number even though the user communication device 110 does not have an incoming telephone number. The communications service provider 120 enables the user communication device 110 to participate in the call as if the temporary telephone number was the incoming telephone number for the user communication device 110.

The communications service provider 120 receives an indication that the user communication device 110 has disconnected from the communications service provider 120 (360). For example, the communications service provider 120 receives an indication that the connection between the communications service provider 120 and the user communication device 110 is no longer available (e.g., the user has logged off or otherwise ended the connection).

In response to receiving the indication that the user communication device 110 has disconnected, the communications service provider 120 returns the temporary telephone number to the pool of available telephone numbers (370). For example, the communications service provider 120 may disassociate the temporary telephone number from the user communication device 110 and designate the telephone number as available in electronic storage. The communications service provider 120 may assign the temporary telephone to another user communication device connected to the communications service provider 120 such that the other user communication device will receive calls placed to the temporary telephone number.

Figure 4:
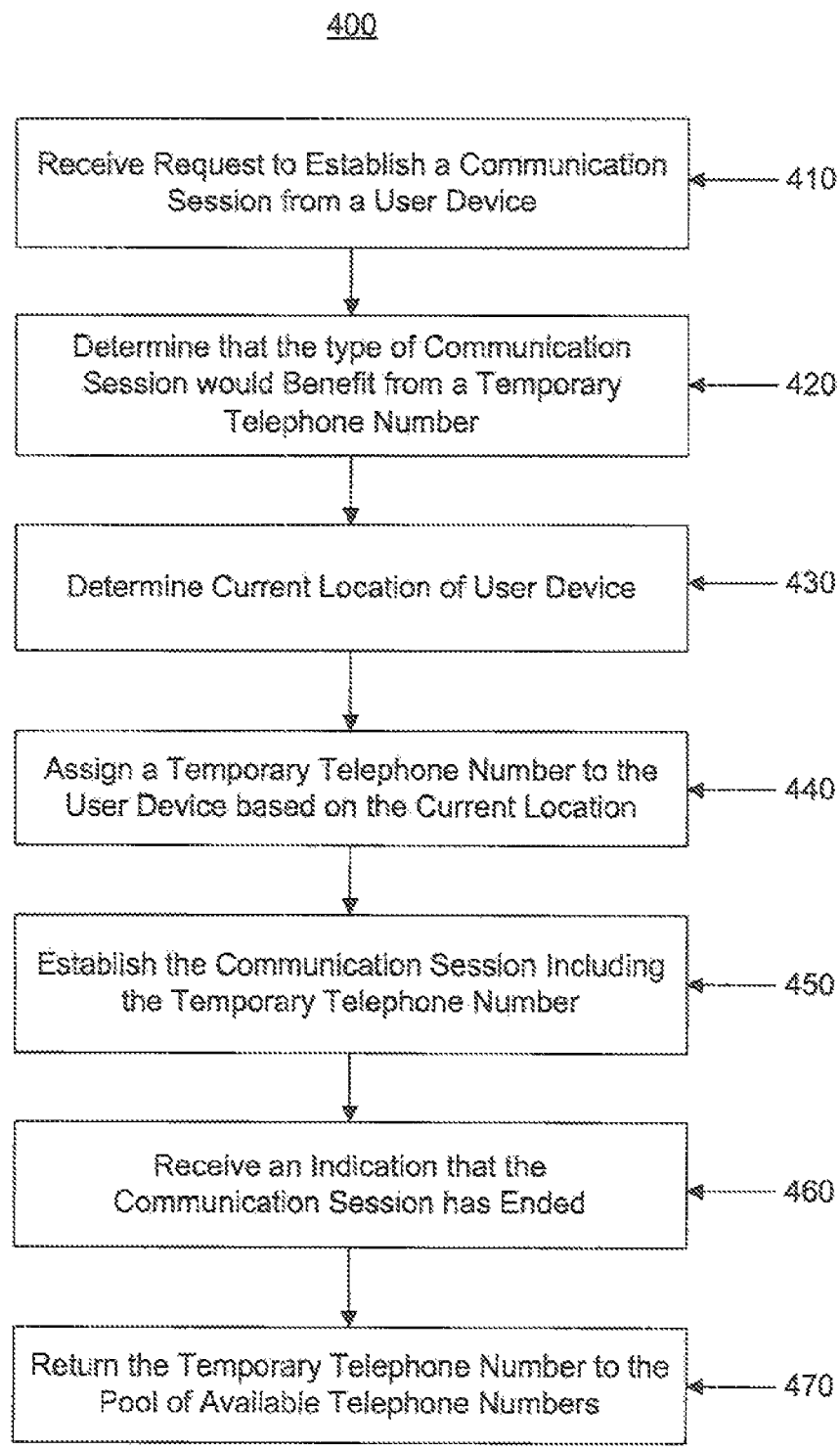
FIG. 4 is a flow chart of another process for assigning a temporary telephone number to a user device in a communications system.

FIG. 4 is a flow chart of a process 400 for assigning a temporary telephone number to a user device in a communications system. For convenience, particular components described with respect to FIG. 1 are referenced as performing the process 400. However, similar methodologies may be applied in other implementations where different components are used to define the structure of the system, or where the functionality is distributed differently among the components shown by FIG. 1.

The communications service provider 120 receives a request to establish a communication session from the user communication device 110 (410). For example, the communications service provider 120 may receive a request from the user communication device 110 to establish a communication session with the recipient communication device 160a or 160b. The user communication device 110 may have previously established a connection with the communications service provider 120 or the request to establish a communication session may be an initial communication to the communications service provider 120. The request may be to establish a voice communication session and/or a data communication session. For example, the request may be a request to place a call to a VoIP telephone, a request to place a call to a telephone connected to the PSTN, or a request to establish an instant messaging session.

The communications service provider 120 determines whether the type of communication session would benefit from a temporary telephone number (420). In one implementation, the communications service provider 120 may analyze the communication session request to determine whether a temporary telephone number would be beneficial. For example, the communications service provider 120 may determine whether the type of communication session would benefit from having a telephone number with which the recipient may be able to determine the location of the user or place a return call to the user. The service provider, for example, may assign a temporary telephone number if the request is to place a call to a telephone connected to the PSTN, but may not assign a temporary telephone number if the request is to establish an instant messaging session. In another implementation, the communications service provider 120 may determine to assign a temporary telephone number to some requests to establish a communication session of a particular type, but not other requests to establish a communication session of that type. For example, the communications service provider 120 may determine not to assign a temporary telephone number for a request to place a call to a telephone of a friend connected to the PSTN, but may determine to assign a temporary telephone number for a request to place a call to an emergency services provider connected to the PSTN. In a further implementation, the communications service provider 120 may determine to assign a temporary telephone number for all requests to establish a communication session.

The communications service provider 120 determines a current location of the user communication device 110 (430). The communications service provider 120 may determine a current location of the user communication device as described above with respect to FIG. 2. Additionally or alternatively, the communications service provider 120 may access information identifying the current location of the user communication device 110 previously determined. For example, in one implementation, the communications service provider 120 may retrieve a current location of the user communication device 110 from electronic storage. In another implementation, the communications service provider 120 may access a location key associated with the user communication device 110. For example, the communications service provider 120 may retrieve a location key associated with the user communication device 110 from electronic storage or may access a location key associated with the user communication device 110 included in communications sent from the user communication device 110 to the communications service provider 120 (e.g., the location key may be included in the request to establish the communication session).

The communications service provider 120 assigns a temporary telephone number to the user communication device 110 based on the current location of the user device (440). The temporary telephone number may be geographically correct for the user communication device 110 and the communications service provider 120 may assign the temporary telephone number to the user communication device 110 as described above with respect to FIG. 3.

The communications service provider 120 establishes the communication session requested by the user communication device 110 including the temporary telephone number in information used to establish the communication session (450). For example, the temporary telephone number may be included in call set up information as the call back telephone number in a telephone call and may be used to determine the identity and/or location of the user communication device 110. The temporary telephone number may also be used in establishing the communication session. For example, if the user communication device 110 places a call to emergency services, the temporary telephone number is used to determine the location of the user communication device 110 and route the call to the appropriate public safety answering point for the location of the user communication device 110.

The communications service provider 120 receives an indication that the communication session has ended (460). For example, the communications service provider 120 receives an indication that the user communication device 110 has ended the communication session or that the communication session has been otherwise ended. In one implementation, the indication enables the communications service provider 120 to determine whether the communication session ended due to the communication session completing successfully or the communication session ended due to an error.

The communications service provider 120 returns the temporary telephone number to the pool of available telephone numbers (470). The communications service provider 120 may return the temporary telephone number to the pool of available telephone numbers immediately upon receiving the indication that the communication session has ended or may wait a threshold amount of time after receiving the indication that the communication session prior to returning the temporary telephone number to the pool of available telephone numbers. Waiting a threshold amount of time prior to returning the temporary telephone number to pool of available numbers may enable the communication session recipient to place a return call to the user communication device 110 when the communication session ends due to an error. In one implementation, the communications service provider 120 immediately returns the temporary telephone to the pool of available telephone numbers when the indication that the communication session has ended indicates that the communication session ended due to the communication session completing successfully and waits a threshold amount of time prior to returning the temporary telephone to the pool of available telephone numbers when the indication that the communication session has ended indicates that the communication session ended due to an error. In another implementation, the communications service provider 120 may wait a threshold amount of time for all communication sessions or may wait a threshold amount depending on the type of communication session. For example, the communications service provider 120 may wait a threshold amount of time for all calls placed to emergency services. In another implementation, the communications services provider may wait until the user has declared a new location associated with the user communication device 110. The communications service provider 120 may return the temporary telephone number to the pool of available telephone numbers as discussed above with respect to FIG. 3. Once the communications service provider 120 returns the temporary telephone number to the pool of available telephone numbers, the temporary telephone number may be assigned to the user communication device 110 in a subsequent communication session request or may be assigned to a different user communication device in a subsequent communication session request.

Figure 5:
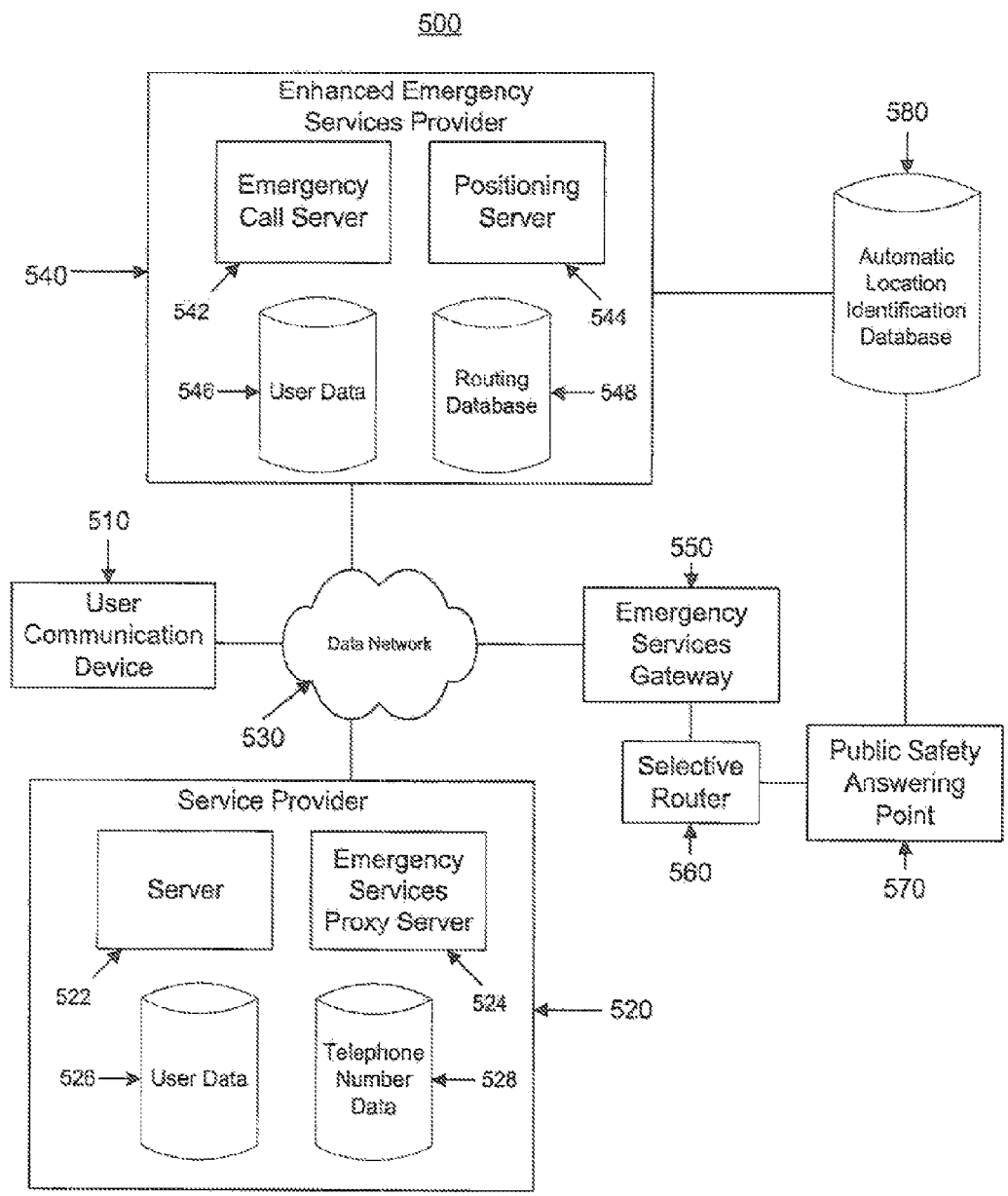
FIG. 5 a block diagram of a communications system configured to handle emergency services communications.

FIG. 5 illustrates an example of a communications system 500 configured to handle emergency services communications. The communications system 500 includes a user communication device 510, a communications service provider 520, an enhanced emergency services provider 540, an emergency services gateway 550, a selective router 560, a public safety answering point (PSAP) 570, and an automatic location identification database 580. The data network 530 facilitates communications between the user communication device 510, the communications service provider 520, the enhanced emergency services provider 540, and the emergency services gateway 550.

The user communication device 510 and the data network 530 are configured in a manner similar to user communication device 110 and data network 130 described above with respect to FIG. 1.

The communications service provider 520 is configured in a manner similar to communications service provider 120 described above with respect to FIG. 1. More specifically, the communications service provider 520 includes a server 522, an emergency services proxy server 524, a user data store 526, and a telephone number data store 528. The server 522 may be configured to communicate with the emergency services proxy server 524 and access the user data store 526 and the telephone number data store 528. The server 522 may be configured to control operations of the communications service provider 520 similar to the operations described above with respect to communications service provider 120.

The emergency services proxy server 524 is configured to handle requests for a communication session with an emergency services provider received by communications service provider 520. For example, the emergency services proxy server 524 is configured to handle a 9-1-1 call placed by the user communication device 510. The emergency services proxy server 524 may be configured to communicate with the server 522 and access the user data store 526 and the telephone number data store 528. The emergency services proxy server 524 is configured to handle an emergency services call in a manner similar to communications service provider 120 described above with respect to FIG. 1. In one implementation, when the communications service provider 520 receives a request from a user device to establish a communication session with an emergency services provider, the emergency services proxy server 524 may be configured handle the request. In this implementation, the emergency services proxy server 524 may be configured to assign a temporary, geographically-correct telephone number to the user device requesting to establish a communication session with an emergency services provider as discussed above, access a previously stored key or determine a location key for the user device, and relay the request to enhanced emergency service provider 540 including the temporary telephone number and the location key. For example, user communication device 510 may be a VoIP endpoint without a registered telephone number in the PSTN and may place an emergency services call to communications service provider 520. The emergency services proxy server 524 may assign a temporary, geographically-correct telephone number on the PSTN to and obtain a location key for the user communication device 510. The emergency services proxy server 524 may relay the call to the enhanced emergency service provider 540 including the temporary telephone number and the location key such that the emergency service call may be routed to an appropriate PSAP and the user communication device 510 may be able to receive a return call from the PSAP at the temporary telephone number if the initial call becomes disconnected due to an error.

The user data store 526 and the telephone number data store 528 are configured to operate in a manner similar to the user data store 122 and the telephone number data store 124 described above.

The server 522 and the emergency services proxy server 524 may include one or more local or remote electronic systems. The user data store 526 and the telephone number data store 528 may include one or more locally or remotely accessible storage devices.

The enhanced emergency services provider 540 is configured to facilitate handling of a request to establish a communication session with an emergency services provider by enabling interoperability of non-traditional communication networks with established, traditional PSTN-based emergency services. For example, the enhanced emergency services provider 540 may be configured to operate as set forth in the National Emergency Number Association (NENA) technical specifications for connecting VoIP callers to emergency services. [See Interim VoIP Architecture for Enhanced 9-1-1 Services (i2), NENA_08-011_V1_12-06-05] ("NENA Guidelines"). The enhanced emergency services provider 540 includes an emergency call server 542, a positioning server 544, a user data store 546, and a routing database 548.

The emergency call server 542 is configured to receive a request to establish an emergency services communication session from the communications service provider 520. The emergency call server 542 may be configured to communicate with the positioning server 544 to receive routing instructions and query keys to include with its further communications. In one implementation, the emergency call server 542 sends the location key it received from the communications service provider 520 to the positioning server 544 and receives back the emergency services routing number and the emergency services query key needed to relay the call setup to the proper emergency services gateway 550. The emergency call server 520 may be a call server/proxy server or Routing Proxy/Redirect Server described in the NENA guidelines and the location key may be a location key described in the NENA Guidelines. The emergency services routing number may be an Emergency Services Routing Number (ESRN) as described in the NENA Guidelines and the emergency services query key may be an Emergency Services Query Key (ESQK) described in the NENA Guidelines.

The positioning server 544 is configured to update the data stores of the enhanced emergency services provider 540 and determine call routing information based on the temporary telephone number and location key included in the emergency services communication request. The positioning server 544 may be configured to communicate with the emergency call server 542 and access the user data store 546 and the routing database 548. In one implementation, the positioning server 544 determines routing information for the emergency services call based on the temporary telephone number and the location key included in the emergency services call. The positioning server 544 may allocate an ESQK and associate the ESQK with location information for the user such that the positioning server 544 may provide location information for the user when later presented with the ESQK. The positioning server 544 may provide the routing information to the emergency call server 542 such that the emergency call server 542 may update the call information and relay the call to the appropriate gateway. The positioning server 544 may be a VoIP Positioning Center and the routing information may include an Emergency Services Routing Number and Emergency Services Query Key as described in the NENA Guidelines. The positioning server 544 may also communicate with the automatic location identification database 580 to provide location and call back number information to PSAP 570 as described below.

The user data store 546 is configured to store a current location and/or telephone number of a user device requesting to establish a communication session with an emergency services provider. For example, the user data store 546 may be configured to operate in a manner similar to the user data store 520 described above or the user data store 546 may be configured to obtain user information from the user data store 526.

The routing database 545 is configured to store data necessary to determine routing information for establishing a communication session with an emergency services provider. In one implementation, the routing database 548 includes data identifying an emergency services zone and routing information for that emergency services zone for a received location. For example, the routing database 548 may include a table mapping locations with emergency services zones and corresponding routing information. The routing database 548 may be an ESZ Routing Database as described in the NENA Guidelines.

The emergency call server 542, the positioning server 544, the user data store 546, and the routing database 548 may include one or more local or remote electronic systems and/or one or more locally or remotely accessible storage devices.

The emergency services gateway 550 is configured to enable communications between data network 530 and a PSAP. For example, the emergency services gateway 550 may convert communications from data network 530 to communications suitable for delivery to a PSAP. In one implementation, the emergency services gateway 550 may use routing information provided by enhanced emergency services provider 540 to select an appropriate selective router to route an emergency services call to an appropriate PSAP. The emergency services gateway 550 may enable an emergency services call to be routed to a PSAP over the PSTN. By enabling communications between data network 530 and a PSAP, the gateway 550 enables a device connected only to data network 530 to successfully complete an emergency services call. The emergency services gateway 550 may be an emergency services gateway as described in the NENA Guidelines.

The selective router 560 is configured to relay an emergency services call to an appropriate PSAP (e.g., PSAP 570). For example, the selective router 560 may relay an emergency services call from the user communication device 510 to the PSAP 570 based on the routing information provided by the enhanced emergency services provider 540. The selective router 560 may be a selective router as described in the NENA Guidelines.

The PSAP 570 is configured to receive an emergency services call and initiate the rendering of emergency services. For example, the PSAP 570 may receive an emergency services call originated by the user communication device 510 and initiate the rendering of emergency services to the user using the user communication device 510 (e.g., dispatching police, medical, or fire assistance). The PSAP 570 may be a PSAP as described in the NENA Guidelines.

The automatic location identification database 580 is configured to provide location and call back number information to the PSAP 570. The automatic location identification database 580 may include one or more local or remote electronic systems and/or one or more locally or remotely accessible storage devices. When the PSAP 570 receives an emergency services call, the PSAP 570 may, for example, communicate with the automatic location identification database 580 to obtain location and call number data related to the emergency services call. In one implementation, the PSAP 570 requests location and call back number information from the automatic location identification database 580 when the PSAP 570 receives an emergency services call and the automatic location identification database 580, in turn, requests the information from the enhanced emergency services provider 540. In this implementation, the positioning server 544 of the enhanced emergency services provider 540 accesses the information from the user data store 546 and provides the information to the automatic location identification database 580. Based on the information provided by the automatic location identification database 580, the PSAP 570 may be able to determine a location related to an emergency services call and place a return call to user device originating an emergency services call if the call becomes disconnected. The automatic location identification database 580 may be an Automatic Location Identification Database as described in the NENA Guidelines.

Figure 6:
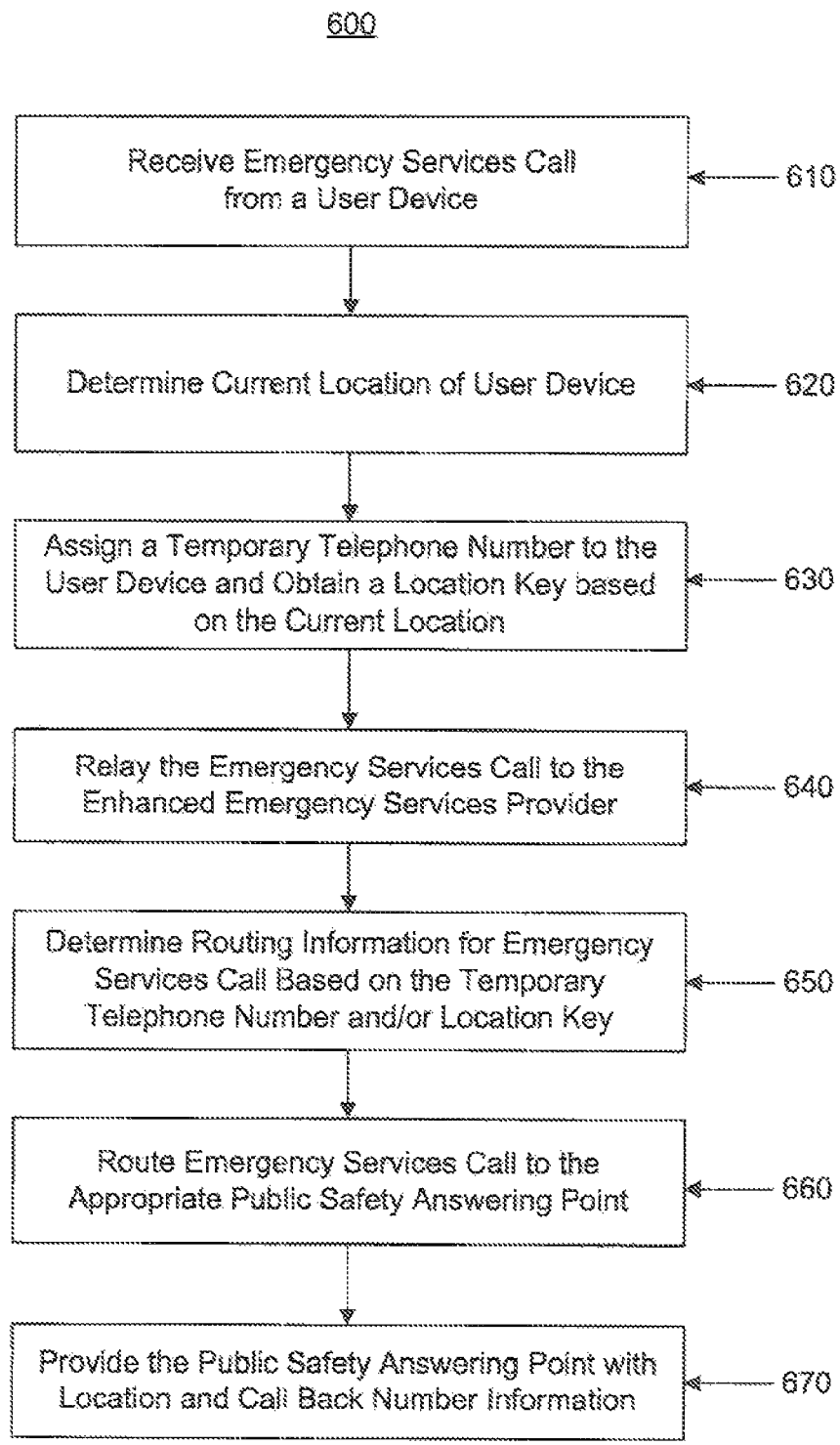
FIG. 6 is a flow chart of a process for handling an emergency services call in a communications system.

FIG. 6 is a flow chart of a process 600 for handling an emergency services call in a communications system. For convenience, particular components described with respect to FIG. 5 are referenced as performing the process 600. However, similar methodologies may be applied in other implementations where different components are used to define the structure of the system, or where the functionality is distributed differently among the components shown by FIG. 5.

The communications service provider 520 receives an emergency services call from the user communication device 510 (610). For example, the user communication device 510 may be a VoIP endpoint without a registered telephone number in the PSTN and the communications service provider 520 may receive a 911 call placed by the user communication device 510. In one implementation, the communications service provider 520 receives the emergency services call and directs the call to the emergency services proxy server 524 fur processing.

The communications service provider 520 determines a current location of the user communication device 510 (620). The communications service provider 520 may determine a current location of the user communication device 510 in a manner similar to the communications service provider 120 as described above with respect to FIGS. 1-4.

The communications service provider 520 assigns a temporary telephone number to and obtains a location key for the user communication device 510 based on the current location of the user communication device 510 (630). For example, the emergency services proxy server 524 accesses information identifying the current location of the user communication device 510, accesses available telephone number data from the telephone number data store 528, and assigns a temporary telephone number to the user communication device 510. In one implementation, the emergency services proxy server 524 assigns a telephone number that is geographically correct for the user communication device 510. For example, the emergency services proxy server 524 may determine the emergency services zone that corresponds to the current location of the user communication device 510 and retrieve an available telephone number corresponding to that emergency services zone from the telephone number data store 528. The emergency services proxy server 524 may store information reflecting the assignment of a temporary telephone number in the user data store 526 and/or the telephone number data store 528.

The emergency services proxy server 524 also obtains a location key for the user communication device 510. In one implementation, the emergency services proxy server 524 generates a location key for the user communication device 510 based on the current location of the user device. In another implementation, the emergency services proxy server 524 accesses a previously stored location key associated with the user communication 510 from electronic storage. In a further implementation, the user communication device 510 includes a location key in information included in the emergency services call and the emergency services proxy server 524 analyzes the emergency services call to obtain the location key. The emergency services proxy server 524 may store information identifying the location key for the user communication device 510 in the user data store 526 and/or the telephone number data store 528.

The communications service provider 520 relays the emergency services call to the enhanced emergency services provider 540 (640). For example, the emergency services proxy server 524 updates the emergency services call information to include the temporary telephone number and the location key and sends the updated emergency services call to the enhanced emergency services provider 540. The enhanced emergency services provider 540 receives the updated emergency services call for processing.

The enhanced emergency services provider 540 determines routing information for the emergency services call based on the temporary telephone number and/or location key (650). For example, the positioning server 544 may access information stored in routing database 548 to determine appropriate routing information for the emergency services call based on the temporary telephone number and/or location key. In one implementation, the positioning server 544 analyzes the temporary telephone number to determine the emergency services zone that corresponds to the temporary telephone number. Based on the determined emergency services zone, the positioning server 544 accesses routing information for the determined emergency services zone from the routing database 548. In another implementation, the positioning server 544 analyzes the location key to determine the emergency services zone and accesses routing information for the determined emergency services zone from the routing database 548. In a further implementation, the positioning server 544 utilizes both the temporary telephone number and the location key to determine routing information for the emergency services call. The positioning server 544 may also determine routing information based on location information stored in the user data store 546 or otherwise included in the call information. The enhanced emergency services provider may store the call information, including the temporary telephone number and location key, in the user data store 546.

The enhanced emergency services provider 540 routes the emergency services call to the appropriate PSAP (660). For example, the emergency call server 542 may receive the call information and routing information from the positioning server 544 and may send the emergency services call to the PSAP 570. In one implementation, the emergency call server 542 sends the emergency services call with updated routing information to the emergency services gateway 550, which sends the emergency services call to the selective router 560. The selective router 560 routes the emergency services call to the PSAP 570.

The automatic location identification database 580 provides the PSAP 570 with location information and a call back number (670). In one implementation, the automatic location identification database 580 communicates with the enhanced emergency services provider 540 to obtain the location information and the call back number. In another implementation, the automatic location identification database 580 provides the PSAP 570 with location information and a call back number stored in the automatic location identification database 580. After receiving information from the automatic location identification database 580, the PSAP 570 may have the current location of the user communication device 510 and a number with which the PSAP 570 may place a return call to the user communication device 510 in the event that the initial call becomes disconnected.

Figure 7:
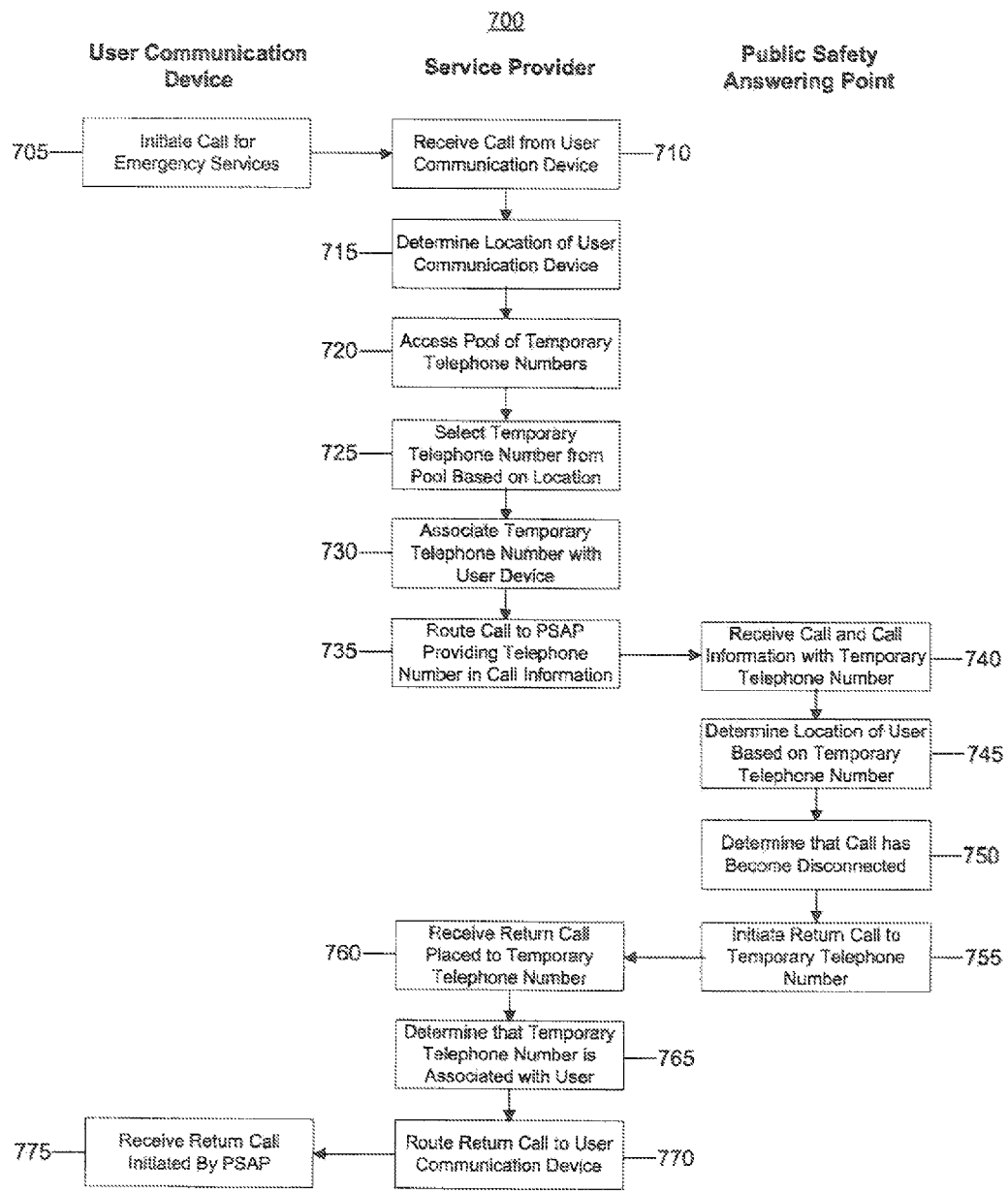
FIG. 7 is a flow chart of another process for handling an emergency services call in a communications system.

FIG. 7 is a flow chart of a process 700 for handling an emergency services call in a communications system. For convenience, a user communication device, a communications service provider, and a public safety answering point are referenced as performing the process 700. However, similar methodologies may be applied in other implementations where different components are used to define the structure of the system, or where the functionality is distributed differently among the components. For example, the process 700 may be performed by the components described with respect to FIG. 5 and the communications service provider 520 and the enhanced emergency service provider 540 may collectively perform the processes shown as being performed by the service provider in FIG. 7.

The user communication device initiates a call for emergency services (705). For example, the user communication device may be a VoIP telephone that has no registered telephone number in the PSTN, a user may dial 9-1-1 using the VoIP telephone, and the VoIP telephone may place an emergency services call in a format used by VoIP.

The communications service provider receives the call from the user communication device (710). For example, the communications service provider may be a VoIP service provider configured to handle calls placed by the user communication device and receives the emergency services call from the user communication device.

The communications service provider determines a location of the user communication device (715). The communications service provider may determine a location of the user communication device in a manner similar to the communications service provider 120 or the communications service provider 520 described above with respect to FIGS. 1-6.

The communications service provider accesses a pool of temporary telephone numbers (720). For example, the communications service provider may maintain, in electronic storage, a pool of temporary telephone numbers with which the communications service provider may associate with user communication devices and access the pool of temporary telephone numbers from the electronic storage.

The communications service provider selects a temporary telephone number from the pool based on the determined location of the user communication device (725). For example, the communications service provider may analyze the pool of temporary telephone numbers and select a temporary telephone number that corresponds to the location of the user communication device. In one implementation, the communications service provider may store location information for each of the temporary telephone numbers in the pool of temporary telephone numbers and compare the location of the user communication device with the location information to determine a match. In another implementation, the communications service provider may associate each service address it has knowledge of with a block of temporary telephone numbers and pick one from the block when presented with a corresponding location.

The communications service provider associates the selected temporary telephone number with the user communication device (730). For example, the communications service provider may store information in electronic storage indicating that the temporary telephone number is associated with the user communication device. In one implementation, when the communications service provider receives a call placed by the user communication device, the communications service provider accesses information stored for the user communication device and handles the call from the user communication device based on the temporary telephone number associated with the user communication device. In another implementation, when the communications service provider receives a call placed to a temporary telephone number, the communications service provider accesses information stored for the temporary telephone number and handles the call to the temporary telephone number based on the user communication device associated with the temporary telephone number.

The communications service provider routes the call for emergency service to the PSAP providing the temporary telephone number in the call information (735). For example, the communications service provider may determine an appropriate PSAP to which to route the emergency services call based on the location of the user communication device and route the call according to routing information for the appropriate PSAP. The communications service provider includes the temporary telephone number in call information associated with the call. The call information that includes the temporary telephone is sufficient to identify the temporary telephone number. For example, the call information may be information used for routing the call and/or information used in determining a telephone number associated with a call for caller identification. In one implementation, the communications service provider may route the call to an emergency service gateway providing the temporary telephone number in call information associated with the call. In this implementation, the emergency services gateway may be configured to route the call to the appropriate PSAP based on the call information.

The PSAP receives the call and call information associated with the temporary telephone number (740). The temporary telephone number is a geographically-correct telephone number for the caller 705 and may be used to call back the caller. For example, the PSAP receives the call and establishes communications with the user communication device.

The PSAP determines the location of the user communication device based on the temporary telephone number (745). For example, the PSAP accesses the call information, provides identifying information to another device (e.g., an automatic location identification database), and receives location information and the temporary telephone number from the other device. Determining the location based on the temporary telephone number may enable the PSAP to verify the location of the user and dispatch emergency services to the user without requiring the user to identify a location because the location was previously identified and associated with the temporary telephone number. For example, determining the location based on the temporary telephone number may enable the PSAP to dispatch emergency services to the user using the user communication device in situations where the call becomes disconnected prior to the user identifying the user's location to an emergency services operator.

The PSAP determines that the call for emergency services has become disconnected (750). For example, the PSAP may determine that the connection with the user communication device is no longer established because the user communication device ended the call or a communication error occurred. In one implementation, the PSAP may determine that the call has become disconnected when the user communication device fails to send new communications for a threshold period of time.

The PSAP initiates a return call to the temporary telephone number (755). For example, the PSAP places a call using information sufficient to route the call to a device associated with the temporary telephone number. In one implementation, the PSAP places a call to the temporary telephone number over the PSTN. In this implementation, the user communication device may be a VoIP telephone that has no registered telephone number in the PSTN and may not be able to directly receive a call placed from the PSAP.

The communications service provider receives the return call placed to the temporary telephone number (760). For example, the communications service provider may include a device (e.g., a gateway) associated with the temporary telephone number in the PSTN and the device may receive the return call.

The communications service provider determines that the temporary telephone number is associated with the user communication device (765). For example, the communications service provider may access information in electronic storage associated with the temporary telephone number and analyze the information to determine that the user communication device is currently associated with the temporary telephone number.

The communications service provider routes the return call to the user communication device (770). For example, the communications service provider accesses information indicating a method of communicating with the user communication device and the routes the emergency services call to the user communication device based on the method of communicating with the user communication device. In one implementation, the call to the temporary telephone number may be placed over the PSTN and the user communication device may be a VoIP telephone that has no registered telephone number in the PSTN. In this implementation, the communications service provider may receive the call placed over the PSTN and may route the call to the IP address associated with the VoIP telephone over an IP network.

The user communication device receives the return call initiated by the PSAP (775). For example, the user communication device receives the call and establishes communications with the PSAP. When the user communication device does not communicate in the manner of a traditional PSTN telephone, association of the temporary telephone number maintained by the communications service provider with the user communication device placing a call for emergency services may enable the user communication device to receive comparable emergency service to a traditional PSTN telephone by utilizing the traditional emergency services technology based on the PSTN.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made without departing from the spirit and scope of the claims. For example, a temporary telephone number and/or location key may be assigned to a user communication device to mask the identity and/or location of the user communication device, rather than provide this information. In addition, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A method for identifying a caller, the method comprising the following operations performed by at least one processor:
 establishing, by a service provider, a connection over a computer network with a user device of a user;
 determining a current location of the user;
 receiving, from the user, a request to place an emergency services call;
 accessing a pool of temporary telephone numbers;
 selecting, in response to receiving the request to place the emergency services call, a temporary, geographically-correct telephone number from among the pool of temporary telephone numbers based on the current location of the user;
 associating the temporary telephone number with the user;
 sending a location key and call back information for the call for storage in an automatic location identification database; and
 initiating the call to a public service answering point using the temporary telephone number.

2. The method of claim 1 further comprising:
 receiving a second call from the public service answering point placed to the temporary telephone number;
 accessing information associated with the temporary telephone number, the information enabling determination of a temporary user associated with the temporary telephone number;
 identifying the user based on the information enabling determination of a temporary user associated with the temporary telephone number; and
 connecting the second call to the identified user.

3. The method of claim 2 wherein:
 the information associated with the temporary telephone number enables determination of a method of connecting the second call to the identified user, and
 connecting the second call to the identified user comprises:
  determining a method of connecting the second call to the identified user based on the information enabling determination of the method of connecting the second call to the identified user, and
  connecting the second call to the identified user using the determined method.

4. The method of claim 1 wherein the current location of the user is remote from a location where the user typically connects to the service provider.

5. The method of claim 1 further comprising:
 associating the temporary telephone number with the user during the connection to the service provider.

6. The method of claim 5 further comprising:
 maintaining association of the temporary telephone number with the user until the user disconnects from the service provider.

7. The method of claim 6 wherein the user comprises a first user, further comprising:
 receiving, from a second user, a request to place a second call to a second call recipient, the second user being different than the first user;
 determining a location of the second user;
 selecting, based on the location of the second user, the temporary telephone number from among the pool of temporary telephone numbers;
 associating the temporary telephone number with the second user; and
 initiating the second call to the second call recipient and providing the temporary telephone number in call information sent to the second call recipient.

8. The method of claim 7 wherein the location of the second user is associated with the same geographic region as the location of the first user.

9. The method of claim 7 further comprising:
 receiving a third call from the second call recipient placed to the temporary telephone number;
 accessing information associated with the temporary telephone number, the information enabling determination of a temporary user associated with the temporary telephone number;
 identifying the second user based on the information enabling determination of a temporary user associated with the temporary telephone number; and
 connecting the third call to the second user.

10. The method of claim 9 wherein:
 the information associated with the temporary telephone number enables determination of a method of connecting the third call to the second user, and
 connecting the third call to the second user comprises:
  determining a method of connecting the third call to the identified user based on the information enabling determination of the method of connecting the third call to the second user, and connecting the third call to the second user using the determined method.

11. The method of claim 1 wherein the temporary telephone number is a telephone number in a public switched telephone network.

12. The method of claim 1 wherein the pool of temporary telephone numbers includes at least one telephone number for each geographic region serviced by the service provider.

13. The method of claim 1 wherein determining the current location of the user comprises receiving user input from the user indicating the location of the user.

14. The method of claim 1 wherein determining the current location of the user comprises receiving a communication, from the user, that includes the location key identifying the location of the user.

15. The method of claim 1 wherein the service provider is a voice over internet protocol service provider.

16. At least one non-transitory computer readable medium storing one or more computer programs, the one or more computer programs comprising instructions for causing at least one processor to perform the following operations:

establishing, by a service provider, a connection over a computer network with a user device of a user;

determining a current location of the user;

receiving, from the user, a request to place an emergency services call;

accessing a pool of temporary telephone numbers;

selecting, in response to receiving the request to place the emergency services call, a temporary, geographically-correct telephone number from among the pool of temporary telephone numbers based on the current location of the user;

associating the temporary telephone number with the user;

sending a location key and call back information for the call for storage in an automatic location identification database; and initiating the call to a public service answering point using the temporary telephone number.

17. The at least one medium of claim 16 wherein the one or more computer programs further comprise instructions for:

receiving a second call from the public service answering point placed to the temporary telephone number;

accessing information associated with the temporary telephone number, the information enabling determination of a temporary user associated with the temporary telephone number;

identifying the user based on the information enabling determination of a temporary user associated with the temporary telephone number; and connecting the second call to the identified user.

18. The at least one medium of claim 17 wherein:

the information associated with the temporary telephone number enables determination of a method of connecting the second call to the identified user, and instructions for connecting the second call to the identified user comprise:

instructions for determining a method of connecting the second call to the identified user based on the information enabling determination of the method of connecting the second call to the identified user, and instructions for connecting the second call to the identified user using the determined method.

19. The at least one medium of claim 16 wherein the current location of the user is remote from a location where the user typically connects to the service provider.

20. The at least one medium of claim 16 wherein the one or more computer programs further comprise instructions for:

associating the temporary telephone number with the user during the connection to the service provider;

maintaining association of the temporary telephone number with the user until the user disconnects from the service provider.

21. The at least one medium of claim 20 wherein the user comprises a first user and the one or more computer programs further comprise instructions for:

receiving, from a second user, a request to place a second call to a second call recipient, the second user being different than the first user;

determining a location of the second user;

selecting, based on the location of the second user, the temporary telephone number from among the pool of temporary telephone numbers;

associating the temporary telephone number with the second user; and initiating the second call to the second call recipient and providing the temporary telephone number in call information sent to the second call recipient.

22. The at least one medium of claim 21 wherein the one or more computer programs further comprise instructions for:

receiving a third call from the second call recipient placed to the temporary telephone number;

accessing information associated with the temporary telephone number, the information enabling determination of a temporary user associated with the temporary telephone number;

identifying the second user based on the information enabling determination of a temporary user associated with the temporary telephone number; and connecting the third call to the second user.

23. The at least one medium of claim 22 wherein:

the information associated with the temporary telephone number enables determination of a method of connecting the third call to the second user, and the instructions for connecting the third call to the second user comprise:

instructions for determining a method of connecting the third call to the identified user based on the information enabling determination of the method of connecting the third call to the second user, and instructions for connecting the third call to the second user using the determined method.

24. The at least one medium of claim 16 wherein the pool of temporary telephone numbers includes at least one telephone number for each geographic region serviced by the service provider.

25. A system comprising:

a connection unit configured to establish, by a service provider, a connection over a computer network with a user device of a user;

a call request unit configured to receive, from the user, an emergency services call;

a pool access unit configured to access a pool of temporary telephone numbers;

a number selection unit configured to select, in response to receiving the request to place the emergency services call, a temporary, geographically-correct telephone number from among the pool of temporary telephone numbers based on the current location of the user;

a number association unit configured to associate the temporary telephone number with the user;

a communication unit configured to send a location key and call back information for the call for storage in an automatic location identification database; and a call initiation unit configured to initiate the call to a public service answering point using the temporary telephone number.

* * * * *